Patented July 11, 1933

1,917,474

UNITED STATES PATENT OFFICE

LOUIS H. VON OHLSEN AND FRANK W. GODSEY, JR., OF NEW HAVEN, CONNECTICUT, ASSIGNORS TO THE SAFETY CAR HEATING & LIGHTING COMPANY, A CORPORATION OF NEW JERSEY

SYSTEM AND APPARATUS FOR REGULATION

Application filed December 24, 1930. Serial No. 504,526.

This invention relates to electric regulation, and more particularly to an apparatus and system for the regulation of alternating current circuits.

One of the objects of this invention is to provide a simple and thoroughly practical system and apparatus for dependably regulating the output of a source of alternating current or for regulating a function of the alternating current energy in a work or translation circuit. Another object is to provide a system and apparatus of the above mentioned character that will be thoroughly reliable in action and that may be inexpensively embodied in practical form. Another object is to provide a system and apparatus of the above mentioned character in which the manifold advantages of a compressible carbon pile variable resistance may be fully and inexpensively realized in the regulation of a function of alternating current energy. Another object is to provide a system and apparatus of the above mentioned character that will be of rugged and durable construction and arrangement and thus, and in other ways, well adapted to meet the widely varying conditions of hard practical use. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

Figure 1:
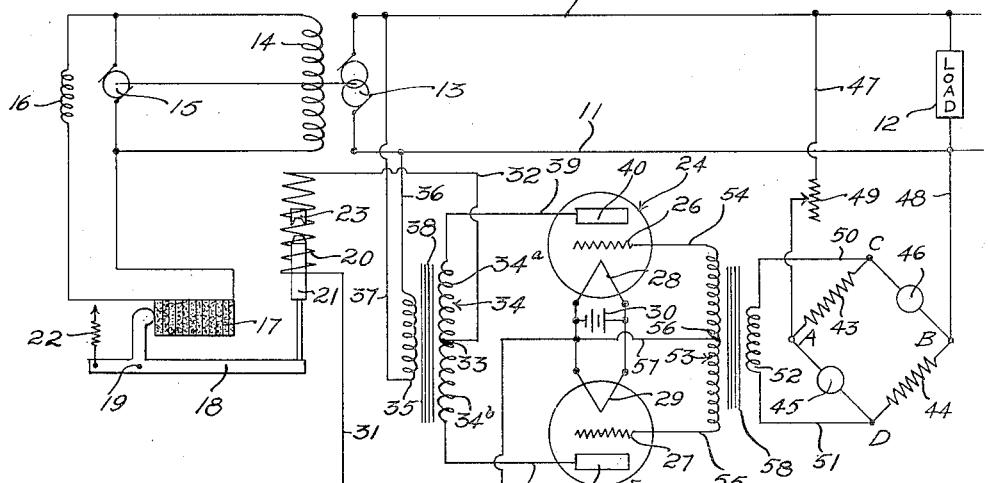

In the accompanying drawing, in which are shown several of various possible embodiments of our invention, Figure 1 shows diagrammatically a preferred form of regulating system and apparatus for regulating the voltage of an alternating current circuit.

Figure 2:
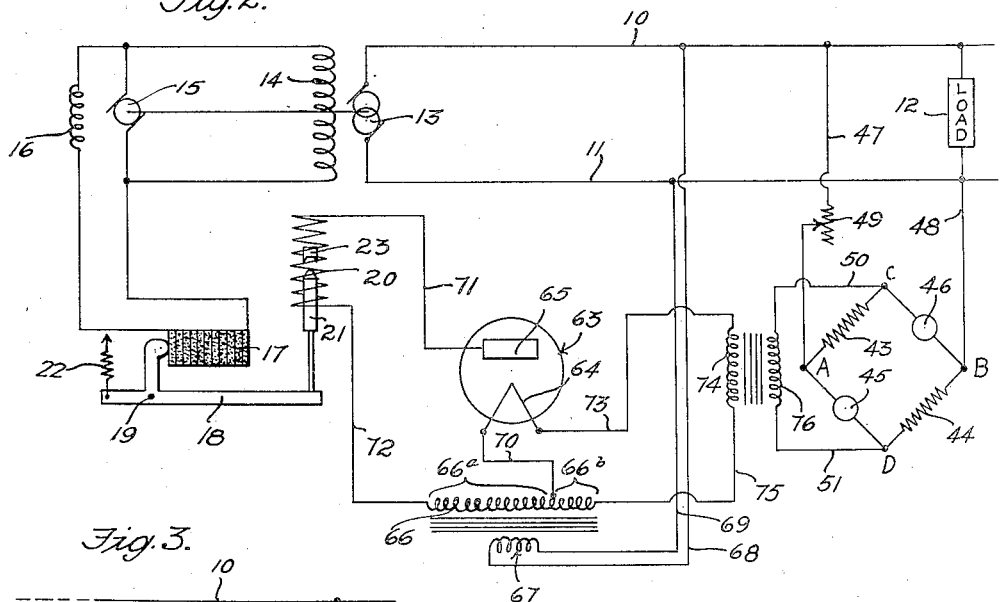
Figure 3:
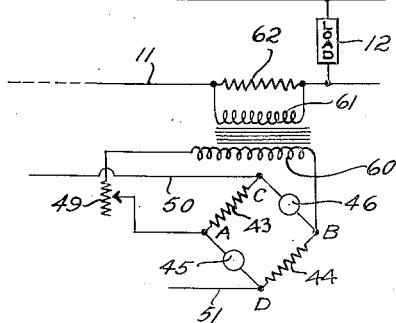

Figure 2 is a similar diagrammatic showing of a possible modified form of system and apparatus, and Figure 3 is a fragmentary diagrammatic showing of a possible rearrangement of certain parts of the systems and apparatuses of Figures 1 and 2 in order to achieve regulation of the current in an alternating current circuit as distinguished from the regulation of the voltage.

Similar reference characters refer to similar parts throughout the several views of the drawing.

Referring now to Figure 1 of the drawing, we have shown a main alternating current circuit 10—11 supplying alternating current to a load 12 of any suitable form, the main line 10—11 being supplied with energy from a suitable source of alternating current illustratively taking the form of an alternator 13 having an exciting field 14 energized by an exciter 15. The exciter 15 may take any suitable form and may, for example, be a shunt wound direct current generator having, hence, a shunt field winding 16. The excitation supplied by the exciter 15 to the field winding of the alternator 13 may be controlled in any suitable manner, preferably, however, by controlling the excitation of the exciter generator 15; hence, there is included in the circuit of the shunt field 16 a carbon pile 17 the pressure upon which, and hence the resistance of which, may be varied, for example, by means of a bell crank lever 18, pivoted as at 19, and having a solenoid winding 20 acting, through the core 21, in a direction to relieve the pressure on the carbon pile 17, and having a spring 22, preferably adjustable, for opposing the action of the winding or coil 20.

The coil 20 and the magnetic circuit to which it is related are designed and contructed, as is diagrammatically indicated in the drawing, so that the winding 20, when energized by a certain value of uni-directional current, holds the core 21 in whatever position it has been moved within its range of movement. For this purpose the core 21 may be tapered at its upper end and may coact with a fixed core piece 23 provided with a correspondingly tapered recess with which the upper tapered end of the core 21 coacts, in a manner now known to those skilled in the art. To achieve this action most efficiently, the current energizing the winding 20 is preferably a uni-directional current and relatively free from pulsations of low frequency. Coil 20, nevertheless, is energized by a function of the alternating current energy supplied to the load or work circuit 12, but, in accordance with certain features of our invention, in a manner to prevent the relatively low frequency, such as 60 or 25 cycles usually employed in commercial power circuits, from having a detrimental effect upon the action of the coil and core and upon the movable parts controlled or operated by the latter.

Coil 20 is connected in circuit with the output circuits of two three-element electronic conduction devices generally indicated at 24 and 25, both being preferably of the thermionic type and having their control grids or elements 26 and 27 respectively controlled in a manner to be more clearly hereinafter described. Devices 24 and 25 are preferably related in push-pull arrangement. The filament cathodes 28 and 29 of the devices 24 and 25 are connected in parallel and are supplied with heating current from any suitable source, diagrammatically indicated in the drawing in the form of a battery 30. A conductor 31 leads from the cathodes 28—29 to one terminal of the coil 20, the other terminal of which is connected by conductor 32 to the mid-point 33 of one winding 34 of a transformer, the other winding 35 of which is connected by conductors 36 and 37 across the main line conductors 10—11. The transformer windings are suitably related to any suitable form of magnetic circuit or core generally indicated at 38. The plate anode 40 of device 24 is connected by conductor 39 to one terminal of the transformer winding 34 while the plate anode 41 of the other device 25 is connected by conductor 42 to the other terminal of transformer winding 34.

By way of the above described arrangement, a suitable plate potential is provided for each vacuum tube 24 and 25, the ratio of transformation of transformer 34—35 being suitably selected with respect to the operating plate voltage of the vacuum tubes and with respect to the voltage of the circuit 10—11; also the coil 20, which controls the carbon pile 17, is provided with a relatively steady uni-directional current derived from the alternating current effective in circuit 10—11.

More specifically, it may here be pointed out, the coil 20 finds itself first in the plate circuit of one vacuum tube during one-half cycle of the alternation potential effective in the circuit 10—11 and then, during the next half-cycle, finds itself in the plate circuit of the other vacuum tube, but the arrangement is such that the energizing current flowing through the coil 20, during these succeeding and alternating half-cycles, is always in the same direction.

To make this action clear let it be assumed that there is, for the moment, effective in the circuit 10—11 a half-cycle of alternating potential such that the voltage set up in winding 34 of transformer 34—35 and corresponding to this half-cycle acts in a direction to cause an electronic flow of current in the circuit including section 34$^b$ and plate 41 and cathode 29 of device 25; during this half-cycle, an electronic current flow in the circuit in which is included the section 34$^a$ and the plate 40 and cathode 38 of device 24 is prevented due to the uni-lateral conductivity of the space between these two electrodes. However, an electronic current flow, corresponding to this half-cycle of potential, flows in the circuit in which is included the lower section 34$^b$ of winding 34 and in which is also included the cathode 29 and plate anode 41 of the device 25. The coil 20 which controls the pressure on the carbon pile 17 is included in both of these circuits. There results therefore an electronic current flow which may be traced as follows:—From the upper terminal 33 of the section 34$^b$ of the transformer winding 34, conductor 32, coil 20, conductor 31, cathode 29 of the device 25, plate anode 41, conductor 42 to the other terminal of winding section 34$^b$.

The next succeeding half-cycle of potential effective in the circuit 10—11 is, of course, reversed in direction so that the corresponding half-wave of potential effective in the transformer winding 34 is ineffective to cause an electronic current flow in the circuit immediately above traced but an electronic current flow takes place through the circuit in which the coil 20 and the electrodes of the device 24 are included. This electronic current flow will be seen to proceed from the lower terminal 33 of winding section 34$^a$, conductor 32, coil 20, conductor 31, cathode 28 of device 24, plate anode 40, and thence by way of conductor 39 back to the remaining terminal of winding section 34$^a$. The resultant current flow through coil 20, during this half-cycle will be seen to be in the same direction as was the current flow through the coil 20 during the preceding half-cycle.

The above described cycle of actions is repeated, with the result that coil 20 is energized by a uni-directional current which may be smoothed out if desired by any suitable means and hence coil 20 may dependably and effectively coact with the magnetic parts 23 and 21 associated with it.

Aside, however, from causing the electronic conduction device 24 and 25 to insure the dependable supply of uni-directional energizing current to coil 20, we cause these devices to multiply or amplify departures from the desired constancy of voltage which it is intended to be maintained across the conductors 10—11 and we do so moreover by means which, of itself, multiply or amplify such departures. More specifically we relate the control elements or grids 26 and 27 of the devices 24 and 25 respectively so as to be controlled in turn by what may be termed a Wheatstone bridge made up of two pairs of arms 43—44 and 45—46.

Arms 45—46 of the bridge are made up of resistance units having such a temperature coefficient of resistance that an increase in voltage to which the unit or units are subjected results in such an increase in the resistance that the resultant current increases at a lesser rate than does the voltage. Conveniently arms 45 and 46 may comprise suitable lengths of iron wire, preferably enclosed in an evacuated tube.

Arms 43 and 44 of the bridge also comprise resistance units but the latter are made of any suitable resistance material having substantially a zero temperature coefficient of resistance.

As illustrative merely of the characteristics of resistance arms 45 and 46, we may note that each arm may comprise an iron wire resistance in an evacuated tube in which resistance an increase in current of only four percent takes place though the voltage increases from fifteen to twenty-one volts, or forty percent.

The bridge is connected across line conductors 10—11 by conductors 47—48, preferably through a variable resistance 49, the purpose and action of which will be described more clearly hereinafter. The opposite junctions of the bridge are connected by conductors 50 and 51 to a winding 52 of a transformer whose other winding 53 has its one end connected by conductor 54 to a control element or grid 26 of the device 24 and its other terminal connected by conductor 55 to control element or grid 27 of the device 25. The mid-point 56 of winding 53 is connected by conductor 57 to the cathodes 28 and 29 of the two electronic conduction devices. The two windings 52 and 53 are related in any suitable manner to any suitable magnetic circuit or core, the latter being diagrammatically indicated at 58.

With arms 45 and 46 made up of resistance units as illustratively above set forth and with the zero temperature coefficient units 43 and 44 each comprising a resistance of eighteen ohms, we find that the bridge is balanced when the voltage across points A and B of the bridge is thirty-six volts, under which condition the voltage difference between points C and D of the bridge is zero and there is then no potential effective upon the transformer winding 52.

If the voltage to be maintained constant across conductors 10—11 is to be thirty-six volts, then variable resistance 49 is set at a zero value. However, by increasing the resistance 49 suitably, the voltage to be maintained constant across the circuit 10—11 may be made to be any value above thirty-six volts. It may at this point, however, be noted that the specific figures given with respect to the construction and action of the Wheatstone bridge are given merely by way of illustration and that the bridge may be constructed, if desired, to be balanced at any voltage other than the above mentioned illustrative voltage of thirty-six volts.

Assuming now that the voltage across the conductors 10—11 is at the intended value so that the voltage across points A and B of the bridge is thirty-six volts, there is effective in transformer winding 52 a zero potential and hence the control elements 26 and 27 are likewise at zero potential. Under these conditions, the pull of coil 20 is in equilibrium with respect to the pull of spring 22, it being understood that the plate circuits of the tubes 24 and 25 are suitably proportioned as to voltage, resistance, and the like to bring about this state of equilibrium.

Should, however, the voltage across conductors 10—11 increase, then the voltage across points A and B of the bridge increases, resulting in an unbalance of the bridge and resulting in turn in the production of a voltage difference between points C and D of the bridge in such a direction that control elements 26 and 27 have impressed upon them a potential which is, relatively speaking, positive; the conductivity of the electronic conduction paths in the devices 24 and 25 is thereupon promptly and greatly increased with the result that the energization of coil 20 is likewise promptly and greatly increased. The state of equilibrium between coil 20 and spring 22 is thus disturbed, the pressure on carbon pile 17 is decreased, and the excitation of alternator 13 diminished to bring the potential across conductors 10—11 back to normal or, more specifically, back to the value at which the bridge will again be balanced.

Should the alternating potential across the conductors 10—11 depart from the desired value but now in a diminishing direction, the bridge is again unbalanced but this time in a direction such that the potential effective across points C and D of the bridge acts in a direction reversed from that in which this potential difference acted when the bridge became unbalanced due to an increase in the voltage across conductors 10—11 above the intended value. Correspondingly the potential effective in winding 52 of the transformer now acts in reverse direction and the control elements or grids 26 and 27 are made relatively negative in potential, thus greatly diminishing the conductivity of the electronic conduction paths in the devices 24 and 25 and correspondingly greatly diminishing the energization of the coil 20.

The theretofore existing state of equilibrium between coil 20 and spring 22 is again disturbed but now in such a manner that spring 22, due to the diminished pull of coil 20, compresses the carbon pile 17, the latter action resulting in increasing the excitation of alternator 13 to bring its voltage back to normal so that the bridge is again balanced and a state of equilibrium between coil 20 and spring 22 re-established.

With an arrangement like that above described, we are enabled to achieve efficient, sensitive and accurate regulation; the Wheatstone bridge responds rapidly, by becoming disproportionately rapidly unbalanced in one direction or the other as departures from the intended potential take place, to swing the potential applied to the control elements or grids 26 and 27 through the high ratio transformer 52—53. Thus the effect of departures from the intended value of potential is quickly transmitted to the control elements and, moreover, in amplified form. The control elements in turn, in coaction with the remaining elements of the electronic devices 24 and 25, achieve a further amplification of this effect, but now act directly upon the controlling coil 20 to cause a readjustment of the excitation of the alternator 13 and to bring about the establishment of a new state of equilibrium between coil 20 and spring 22. As above noted the magnetic circuit or parts associated with the coil 20 are so proportioned with respect to the latter that the movable core 21 is held in whatever position it is moved, within its range of movement, by a given direct current energization of winding 20 corresponding to the intended value of potential to be maintained across the conductors 10–11. The arrangement above described we have found to be admirably adapted to achieve this coaction of coil 20 with its magnetic circuit even though the current energization coil 20 is derived from an alternating current source.

If it is desired to regulate the alternator 13 for constancy of current as distinguishing from constancy of potential as above described, we connect point A and B of the bridge, through a variable resistance 49 (see now Figure 3) to the secondary or high voltage winding 60 of a transformer, the low voltage winding 61 of which is shunted across a low resistance 62 inserted directly in the circuit, as in conductor 11, in which constancy of current is to be maintained. The winding 61 thus responds to the voltage drop across resistance 62 and this voltage drop, which may be and preferably is relatively low, is stepped up by the transformer 61—60 to a voltage which is suited to the voltage characteristic of the bridge, adjustment of the magnitude of the current to be maintained constant being achieved by adjusting the variable resistance 49. The remaining portions of the circuit and apparatus are the same as above described in connection with Figure 1 and the operation of the system for current regulation will be clear, it is believed, in view of the detailed description of the operation of the system of Figure 1. It may be noted, however, that an increase in the current in circuit 10—11 effects an increase in the potential drop across the resistance 62 with the result that the potential applied to points A and B of the bridge is likewise increased, causing unbalance of the bridge in one direction. A decrease in current from the desired value effects a reverse action, causing the bridge to be unbalanced in the opposite direction, with results and actions upon the vacuum tubes and upon the controlling coil 20 that will now be readily understood.

In Figure 2 we have illustrated a possible modification of certain features of our invention. In the arrangement of Figure 2 coil 20 which controls the carbon pile 17 is connected in circuit with a combined rectifier and amplifier of the two-element electronic type, generally indicated at 63 and conveniently taking the form of a two-element thermionic valve. The device 63 therefore has a heated cathode 64 conveniently taking the form of a filament and a plate anode 65.

Coil 20 is connected in circuit with these electrodes and with the portion $66^a$ of a transformer winding 66, the other winding 67 of which is connected by conductors 68 and 69 across the circuit 10—11 of the alternator 13. Portion $66^a$ of winding 66 is suitably proportioned with respect to winding 67 to make effective in the circuit of coil 20 and of the device 63 a suitable operating potential to achieve a suitable energizing current for the coil 20, such current, moreover, being uni-directional due to the uni-lateral conductivity of the device 63.

More specifically the circuit of coil 20 will be seen to extend from the right hand terminal of section $66^a$ of transformer winding 66, conductor 70, filament cathode 64, plate anode 65, conductor 71, coil 20 and thence by way of conductor 72 back to the remaining or left hand terminal of winding section $66^a$.

Filament cathode 64 derives its heating current from section $66^b$ of transformer winding 66 and this heating circuit will be seen to extend from the left hand terminal of winding section $66^b$, conductor 70, filament cathode 64, conductor 73, winding 74 of a transformer and thence by way of conductor 75 back to the remaining or right hand terminal of winding section $66^b$. Winding 74 has inductively related to it a winding 76 which is connected by conductors 50 and 51 across points C and D of the bridge which, in other respects, is the same as to construction and action as was described in connection with Figure 1. Windings 74 and 76 preferably constitute a step-up transformer so that departure from zero potential across winging 76 are appropriately multiplied in winding 74.

When the intended voltage exists across conductors 10—11, the Wheatstone bridge is in a state of balance and there is effective across points C and D of the bridge a zero potential; hence there is zero potential induced in winding 74 and the heating current supplied to cathode 64 is determined by the voltage of section $66^b$ of transformer winding 66. This heating current and the potential of winding section $66^a$ are so selected or proportioned with respect to coil 20 that the latter is in a state of equilibrium with respect to the spring 22, the resistance of carbon pile 17 being thus held fixed.

As soon, however, as the potential across conductors 10—11 increases beyond the intended value at which this state of balance and equilibrium is maintained, the Wheatstone bridge becomes unbalanced and makes effective across points C and D and hence in the winding 76 of transformer 76—74 alternating potential disproportionately greater than the increment of departure from intended voltage and, moreover, in such a direction that the voltage induced in winding 74 of this transformer acts in a direction to be additive to the potential of winding section $66^b$ of transformer 66—67. The heating current supplied to filament cathode 64 is thus quickly and disproportionately rapidly increased and so also is the conductivity of the space between cathode 64 and anode 65 of the electronic device 63. Correspondingly the unidirectional energization of winding 20 is increased, the equilibrium between coil 20 and spring 22 is disturbed, the resistance of carbon pile 17 is increased, and the excitation of alternator 13 reduced sufficiently to bring the potential across circuit 10—11 back to normal, whence the bridge is again balanced, normal heating current to cathode 64 restored, and a condition of equilibrium established and maintained between coil 20 and its spring 22.

Should the potential across conductors 10—11 diminish from the intended value, the Wheatstone bridge again becomes unbalanced but now in a direction such that the potential effective across points C and D and hence across winding 76 is reversed in direction from that which it had when an unbalance due to an increase in potential took place. The potential induced in winding 74 of transformer 76—74 now acts in a direction to oppose the voltage of transformer winding section $66^b$ and thus effects a rapid diminution of heating current supplied to the cathode 64. Correspondingly the conductivity of the space between the electrodes 64 and 65 becomes quickly diminished as does also the uni-directional energization of winding 20. The equilibrium between coil 20 and spring 22 is now again disturbed but this time, due to the diminished pull of coil 20, spring 22 effects a decrease in the resistance of carbon pile 17 and hence an increase in the excitation of alternator 13 to bring the potential across circuit 10—11 back to normal, whence the bridge again becomes balanced, and zero potential is again effective in winding 76 of transformer 76—74. Normal heating current to cathode 64 is restored and normal energizing current through the circuit of coil 20 again restored and a new state of equilibrium between coil 20 and spring 22 established.

If it is desired to cause the arrangement of Figure 2 to achieve constancy of current regulation, points A and B of the Wheatstone bridge are connected across the high voltage winding 60 of transformer 61—60 of Figure 3 so that departures from the intended value of current in circuit 10—11 are made effective to cause departures in potential across points A and B of the bridge and to cause in turn an unbalance of the bridge in one direction or the other to rectify the corresponding departure.

It will thus be seen that there has been provided in this invention a system and apparatus in which the various objects hereinbefore noted, together with many thoroughly practical advantages are successfully achieved. It will be seen that the system and apparatus are highly efficient in action, are of a thoroughly practical nature, and well adapted to meet the varying conditions of hard practical use. Moreover, it will be seen that the system and apparatus function independently of the frequency of the alternating current circuit and that highly sensitive and accurate regulation may be achieved, particularly by way of the arrangement of Figure 1.

As many possible embodiments may be made of the above invention and as many changes might be made in the embodiment above set forth, it is to be understood that all matter hereinbefore set forth or shown in the accompanying drawing is to be interpreted as illustrative and not in a limiting sense.

We claim:

1. In apparatus of the character described, in combination, a source of alternating current, a carbon pile for controlling a function of the output of said source, a coil for controlling the pressure on said carbon pile, a three-element electronic conduction device, one of its elements being a control element, said device having said coil related to its output circuit, means forming a bridge and connected to be responsive to said function of the output of said source and adapted to become unbalanced when departures from intended value of said function take place, and means responsive to unbalanced condition of said bridge for affecting said control element.

2. In apparatus of the character described, in combination, a source of alternating current, a carbon pile for controlling a function of the output of said source, a coil for controlling the pressure on said carbon pile, a three-element electronic conduction device, one of its elements being a control element, said device having said coil related to its output circuit, means forming a bridge and connected to be responsive to said function of the output of said source and adapted to become unbalanced when departures from intended value of said function take place and adapted to make effective a potential difference acting in one direction upon an increase in said function and to make effective a potential difference acting in another direction upon a decrease in said function, and a transformer having one winding connected to be responsive to said potential differences and having another winding connected to affect said control element.

3. In apparatus of the character described, in combination, a source of alternating current, a carbon pile for controlling a function of the output of said source, a coil for controlling the pressure on said carbon pile, a three-element electronic conduction device, one of its elements being a control element, said device having said coil related to its output circuit, means forming a bridge and connected to be responsive to said function of the output of said source and adapted to become unbalanced when departures from intended value of said function take place and adapted to make effective a potential difference acting in one direction upon an increase in said function and to make effective a potential difference upon a decrease in said function, and means relating said control element to said bridge to be responsive to said potential differences.

4. In apparatus of the character described, in combination, a source of alternating current, a carbon pile for controlling a function of the output of said source, a coil for controlling the pressure on said carbon pile, a three-element electronic conduction device, one of its elements being a control element, said device having said coil related to its output circuit, and a Wheatstone bridge having arms of different temperature coefficients of resistance and having two of its points connected to be responsive to change in said function and having said control element related thereto.

5. In apparatus of the character described, in combination, a source of alternating current, a carbon pile for controlling a function of the output of said source, a coil for controlling the pressure on said carbon pile, means for energizing said coil from said source and including a uni-laterally conductive electronic condition device, and means for affecting the conductivity of said device, said means including resistance means disproportionately responsive to changes in said function.

6. In apparatus of the character described, in combination, a source of alternating current, a carbon pile for controlling a function of the output of said source, a coil for controlling the pressure on said carbon pile, means for energizing said coil from said source and including a uni-laterally conductive electronic conduction device, and means for affecting the conductivity of said device, said means including resistance elements of different temperature coefficients connected to be responsive to changes in said function.

7. In apparatus of the character described, in combination, a source of alternating current, a carbon pile for controlling a function of the output of said source, a coil for controlling the pressure on said carbon pile, means for energizing said coil from said source and including a uni-laterally conductive electronic conduction device, a Wheatstone bridge made up of resistance elements two of which are of substantially zero temperature coefficient and two of which are of positive temperature coefficient, means connecting said bridge to be responsive to changes in said function, and means responsive to changes in said bridge for controlling the conductivity of said device.

8. In apparatus of the character described, in combination, a source of alternating current, a carbon pile for controlling a function of the output of said source, a coil for controlling the pressure on said carbon pile, means for energizing said coil from said source and including a uni-laterally conductive electronic conduction device, an electrical bridge having two points thereof connected to be responsive to changes in said function, said bridge being adapted to be balanced as long as said function remains at its intended value and adapted to make effective potential differences acting in a direction depending upon the direction of departure of said function from its intended value, and means responsive to said potential differences for changing the conductivity of said device.

9. In apparatus of the character described, in combination, a source of alternating current, a carbon pile for controlling a function of the output of said source, a coil for controlling the pressure on said carbon pile, means for energizing said coil from said source and including a uni-laterally conductive electronic conduction device, an electrical bridge having two points thereof connected to be responsive to changes in said function, said bridge being adapted to be balanced as long as said function remains at its intended value and adapted to make effective potential differences acting in a direction depending upon the direction of departure of said function from its intended value, and a transformer having one winding connected to be responsive to said potential differences and having its other winding connected to affect the conductivity of said device.

10. In apparatus of the character described, in combination, a source of alternating current, a carbon pile for controlling a function of the output of said source, a coil for controlling the pressure on said carbon pile, an electronic conduction device having a heated cathode for controlling the degree of energization of said coil, and means responsive to departures from intended value of said function for changing the heating of said heated cathode.

11. In apparatus of the character described, in combination, a source of alternating current, a carbon pile for controlling a function of the output of said source, a coil for controlling the pressure on said carbon pile, an electronic conduction device having a heated cathode for controlling the degree of energization of said coil, a transformer having one winding connected to affect the heating current supplied to said heated cathode, and means connecting the other winding of said transformer to be disproportionately responsive to departures from intended value of said function.

12. In apparatus of the character described, in combination, a source of alternating current, a carbon pile for controlling a function of the output of said source, a coil for controlling the pressure on said carbon pile, an electronic conduction device having a heated cathode for controlling the degree of energization of said coil, a transformer having one winding connected to affect the heating current supplied to said heated cathode, means including two resistance elements having different temperature coefficients of resistance connected to be responsive to changes in said function, and means connecting the other winding of said transformer to be responsive to changes produced in said last-mentioned means.

13. In apparatus of the character described, in combination, a source of alternating current, a carbon pile for controlling a function of the output of said source, a coil for controlling the pressure on said carbon pile, an electronic conduction device having a heated cathode for controlling the degree of energization of said coil, means supplying a given amount of heating current to said heated cathode, and means in the heating circuit of said cathode adapted to make effective therein a potential either additive or subtractive depending upon the direction of departure from intended value of said function.

14. In apparatus of the character described, in combination, a source of alternating current, a carbon pile for controlling a function of the output of said source, a coil for controlling the pressure on said carbon pile, an electronic conduction device having a heated cathode for controlling the degree of energization of said coil, means supplying a given amount of heating current to said heated cathode, means forming a bridge connected to be responsive to departures from intended value of said function and adapted to produce potential differences in directions dependent upon the direction of departure from intended value of said function, and means responsive to said potential differences for adding to or subtracting from the heating current supplied to said heated cathode.

15. In apparatus of the character described, in combination, a source of alternating current, a carbon pile for controlling a function of the output of said source, a coil for controlling the pressure on said carbon pile, an electronic conduction device having a heated cathode for controlling the degree of energization of said coil, means supplying a given amount of heating current to said heated cathode, means forming a bridge connected to be responsive to departures from intended value of said function and adapted to produce potential differences in directions dependent upon the direction of departure from intended value of said function, and a transformer having one winding connected to affect the heating current supplied to said cathode and having its other winding connected to be responsive to said potential differences.

16. In apparatus of the character described, in combination, a source of alternating current, means for controlling a function of the output of said source, means connected to said source for actuating said control means, and means responsive to changes in a function of said source connected to said actuating means for vectorially adding or subtracting voltage applied to said actuating means from said source.

17. In apparatus of the character described, in combination, a source of alternating current, means for controlling a function of the output of said source, means for actuating said control means including a thermionic device having anode and cathode electrodes, said cathode being connected to said source of alternating current, and means responsive to changes in a function of said source for vectorially adding or subtracting to the potential applied to said cathode from said source.

18. In apparatus of the character described, in combination, a source of alternating current, a carbon pile for controlling a function of the output of said source, means exerting a force tending to affect the pressure of said carbon pile in one direction, means including a coil acting in opposition to said first-mentioned means and adapted to mechanically balance the latter when said coil is appropriately energized, for controlling the pressure on said carbon pile, a three-element electronic conduction device, one of its elements being a control element, said device having said coil related to its output circuit whereby, at intended value of said function the energization of said coil is appropriate to cause said coil to mechanically balance said first-mentioned means, means forming a bridge and connected to be responsive to said function of the output of said source and adapted to become electrically unbalanced when departures from intended value of said function take place, and means responsive to electrical unbalance of said bridge for affecting said control element and thereby cause departure from said appropriate energization of said coil, whereby the mechanical balance of the latter with respect to said first-mentioned means is disturbed and the pressure on said pile is changed.

In testimony whereof, we have signed our names to this specification this 9th day of December 1930.

FRANK W. GODSEY, Jr.
LOUIS H. VON OHLSEN.

CERTIFICATE OF CORRECTION.

Patent No. 1,917,474.   July 11, 1933.

LOUIS H. VON OHLSEN, ET AL.

It is hereby certified that error appears in the printed specification of the above numbered patent requiring correction as follows: Page 4, lines 125 and 126, for "departure" read "departures"; page 6, line 57, claim 5, for "condition" read "conduction"; and that the said Letters Patent should be read with these corrections therein that the same may conform to the record of the case in the Patent Office.

Signed and sealed this 26th day of September, A. D. 1933.

F. M. Hopkins (Seal)   Acting Commissioner of Patents.